United States Patent [19]

Steranko et al.

[11] 4,051,459
[45] Sept. 27, 1977

[54] STORED PROGRAM CONTROLLED TYPEWRITING/EDITING SYSTEM

[75] Inventors: James Joseph Steranko, Weston; Gerardo Rogoff, Chelmsford; Randall Dean Scott, Andover; Angela Frances Gallagher, Framingham; Peter Burger, West Newton, all of Mass.

[73] Assignee: Editext Word Processing, Inc., Burlington, Mass.

[21] Appl. No.: 437,783

[22] Filed: Jan. 30, 1974

[51] Int. Cl.² .............................................. G06F 7/00
[52] U.S. Cl. ................................................... 364/900
[58] Field of Search ......................... 340/172.5; 444/1

[56] References Cited

U.S. PATENT DOCUMENTS

| | | | |
|---|---|---|---|
| 3,654,609 | 4/1972 | Bluethman et al. | 340/172.5 |
| 3,676,856 | 7/1972 | Manly | 340/172.5 |
| 3,760,375 | 9/1973 | Irwin et al. | 340/172.5 |
| 3,838,396 | 9/1974 | Martin | 340/172.5 |

Primary Examiner—Raulfe B. Zache

[57] ABSTRACT

A typewriting/document editing system includes a signal encoding keyboard for serially entering alphanumeric and control key information characterizing a document being typed into one track of a plural track magnetic storage tape under central processor-stored program control. Each storage record includes an assembled processed line of text augmented by administrative character fields.

When document editing is required, all changes (e.g., deletions, insertions, substitutions, text relocations, and the like) are entered on a batched basis in an edit tape track. The stored text records are then marked with appropriate change descriptions ("Pass 1" operation), and the marked information and edit tape tracks compiled to form the desired revised text which is stored on a second tape ("Pass 2" operation). The revised text may thereafter be derived as desired by automated power typing.

34 Claims, 7 Drawing Figures

MEMORY 300

*PASS 1 COMPILATION*

PASS 2 COMPILATION

STORED PROGRAM CONTROLLED TYPEWRITING/EDITING SYSTEM

DISCLOSURE OF INVENTION

This invention relates to automated business machine equipment and, more specifically, to improved stored program controlled typewriter/editing apparatus.

Prior art automated typewriter equipment has recognized the utility of employing peripheral magnetic storage to record an electronic encoding of alpha-numeric and control keys depressed on a typewriter keyboard. The stored record of a typed document can be used for several purposes, for example, to automatically cause typing of one or multiple recreations of the originally stored document (so called "power typing"), or for document editing purposes.

During editing, an operator attending the composite typewriter-magnetic store system power types those portions of the original text not being changed. Each time a change is desired, the operator (1) terminates power typing; (2) physically types onto the text-receiving paper in the typewriter any material to be added; (3) identifies by appropriate functional control keys any portion of the original material to be deleted (e.g., a letter, word, line, paragraph, and so forth); and (4causes power typing to be resumed until the next change is encountered. This requires the careful attention of the operator, and extensive operator-machine interaction during the entire period when an amended document is being developed. Moreover, in most cases, the changes made to the original stored document during any revision are not preserved and must be redone during each successive draft or copy.

It is, therefore, an object of the present invention to provide improved automated typing/editing apparatus.

More specifically, an object of the present invention is the provision of improved stored program controlled typing/editing apparatus wherein an information store records a typed, encoded document; and wherein all desired editorial changes are entered at a keyboard on a marshalled, batched basis for compilation and execution.

It is another object of the present invention to provide automated editing apparatus which deletes text; adds text; replaces text; moves text; indents; and justifies text, among other operations.

The above and other objects and features of the present invention are realized in a specific, illustrative computerized editing system which includes as a system input/output unit, an electronic typewriter (e.g., a Selectric(tm) unit manufactured by the International Business Machines Co.) for supplying plural bit parallel encoded binary signals identifying depression of any particular alpha-numeric or control key, and which responds to coded systems developed output signals by causing printing on an output document.

In its most basic system aspects, an original text is typed at a keyboard; assembled on a line-by-line basis and supplemented with supervisory line character fields by a stored program controlled central processor; and stored in a line record in an information store such as magnetic tape. The tape has at least two and, preferably, additional tracks, one ("data") track storing the original text and the other ("edit" track) containing editing information as below discussed.

After the original text is fully processed and stored on the data tape track, it will typically be desired to make editorial changes to the document as originally prepared, e.g., additions, deletions, rearrangements and the like. To accomplish this, an operator enters all desired changes into the system at once, referring each to the location of the change (e.g., document, page and line number, and exact word location); and identifying the type of change desired (delete, replace, move, and so forth, supplying all new text, if any). This is effected by simply typing the editorial commands ad seriatim in a prescribed, user oriented format.

The processor responds to the changes by serially entering them as they are received and verified in the edit track of the tape. When all changes are entered, the processor operates on both the edit and text storage tracks to enter (herein "mark") correction command fields in the stored text lines (so called "Pass 1" operation).

Thereafter, again under stored program control, the edit and amended text records are compiled into a revised document which is recorded on a line-by-line basis on another storage medium, e.g., another area of one composite memory, or on another tape ("Pass 2" operation herein). At this point then, the revised document is available for power typing when, and as often as desired. The "revised" document may also be treated as a new "original" which may again be edited as desired.

The above and other features and advantages of the present invention will become more clear from a detailed description of a specific illustrative embodiment thereof, presented hereinbelow in conjunction with the accompanying drawing, in which:

FIG. 1 is an overall block diagram of a specific illustrative typewriting/editing system embodying the principles of the present invention;

FIG. 2 schematically depicts a central processor 200 employed in the system organization of FIG. 1;

FIG. 3 schematically depicts a memory 300 employed in the system organization depicted in FIG. 1;

Figure 1:
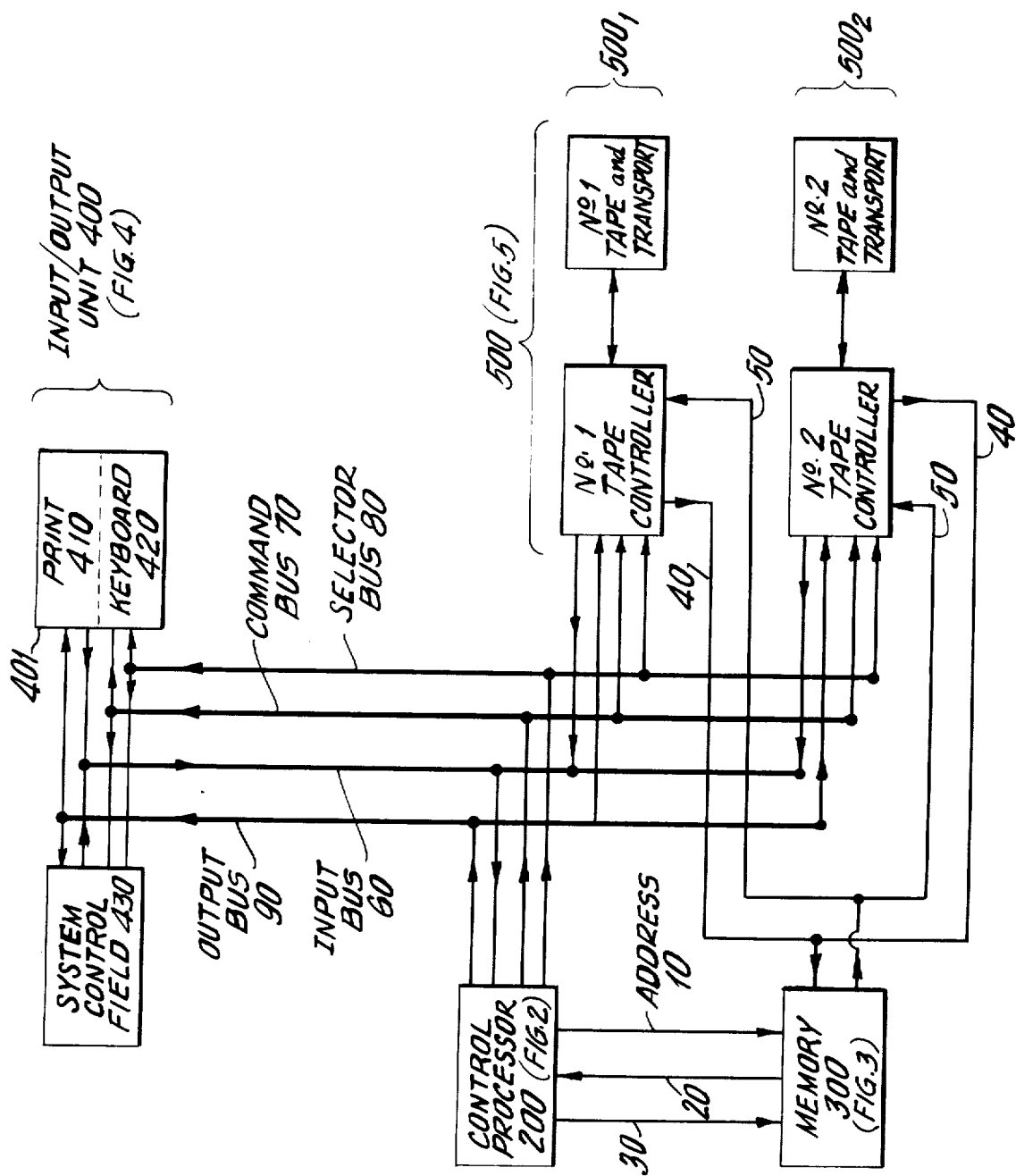

Referring now to the overall system block diagram of FIG. 1, there is included a central processor 200 operative in conjunction with a stored program for effecting the system functions set forth herein. The central processor may comprise any embodiment therefor well known to those skilled in the art, including commercially available mini or micro computer configurations and more particularly the processor portions thereof. One particularly advantageous composite micro processor organization is set forth in more particular detail in FIG. 2 and is discussed below.

In its most basic aspects, an electric typewriter 401 is employed as the input/output medium for communicating alpha-numeric characters typed on a typewriter keyboard 420 for entry into system storage. The typewriter 401 also includes printing apparatus 410 for receiving text characters developed by system processing for outputting, most conventionally "typing" onto paper. Typewriter apparatus 401 for effecting the above, i.e., for providing encoded parallel signals identifying which key on a typewriter keyboard has been depressed, and for responding to a parallel input command for causing printing of a character defined by an encoded incoming command are commercially available. Thus, for example, the selectric(tm) equipment may be employed as the basic typewriter equipment. This is augmented with apparatus, also vended by IBM, for converting mechanical linkage movements internal to the Selectric machine into key identifying parallel electronic output binary signals, with inversely functioning equipment being provided in the IBM equipment for converting received commands into type actuations. Alternatively, such equipment may be added to the basic Selectric machine directly. To this end, it is noted that the IBM Selectric and like machines include a series of internal common linkage bars which become mechanically displaced in a certain and unique pattern when each particular alpha-numeric keyboard key is depressed. This pattern of bar actuations may be converted to parallel output digital signals by simply employing sensors to provide electrical indicia of such motion. This may take the form of a magnet mechanically fixed to each bar for relative movement with respect to a fixed magnetic field sensor, such as a reed switch, so that a unique pattern of switch opening or closures is produced as a particular subset of the key linked bars move. Similar mechanical motions are encoded for each control key, e.g., carriage return, back space, spacer bar, and the like.

The input/output unit 400 also includes a control field 430 which includes system control keys (and mode indicating lights) which supplement the keys normally associated with a typewriter. Such additional system keys included such things as an "edit" mode key by which an operator informs a system that a document editing mode is to begin, a "record" mode key to signal that documentary text will be generated at the keyboard 420 for storage; various administrative-type commands such as to rewind one or the other of the system magnetic storage tapes described below; various power typing play back commands; and the like.

The composite system arrangement of FIG. 1 includes a memory 300 which includes both the stored program for controlling system operation; and also a scratch pad memory portion for storing the operand variables upon which the system is then operating. Program storage may be in any conventional memory structure therefor. However, in the preferred form of our invention, the programs are stored on a firmware basis in a read only memory (ROM or PROM). The operand variables must of course be stored in read-write memory, e.g., commercially available semiconductor RAMS:

The contents of the memory 300 flow between the memory and the central processor 200, and between the memory 300 and tape controllers 500 discussed below. More particularly, an address in the memory 300 is communicated from the processor 200 to the memory 300 via an address bus 10, and data flows between the processor and memory via data buses 20 and 30 in the directions schematically indicated in FIG. 1. The memory 300 may also perform on a direct memory channel basis, i.e., permit high rate data flow between one tape unit 500 and the memory 300 via one of the data buses 40 or 50.

As further system apparatus, the typewriting/editing arrangement of FIG. 1 employs bulk information storing memory, e.g., magnetic tape. For purposes more fully discussed below, two magnetic storage areas are required during the processing of the present invention and, accordingly, two tapes and tape controllers $500_1$ and $500_2$ are employed, the subscripts designating what will hereinafter be referred to quite arbitrarily as the number 1 and number 2 tapes. It will be appreciated by those skilled in the art that the information storage required for all aspects of the instant invention may be of any form including, if desired, differing portions of a single composite storage medium.

In general terms, information (an original text) is supplied character-by-character at the keyboard 420, and is entered into the system where it is assembled into lines by the central processor 200 and memory 300. When a line has been fully assembled in proper format in a particular register location in the memory 300 (quite simply recognized by receipt of a carriage return from the input mechanism 401), it is read out on a high speed basis over the direct memory channel bus 50 for entry into the next available line storing record of the appropriate tape 1 or 2 by the associated controller 500. Similarly, during documentary play back, text material is read on a line-by-line basis from the appropriate tape, passing via the associated controller and direct memory channel bus 40 into the memory 300 where it is available for processing and/or outputting by the central processor 200.

The composite typewriting/editing system of FIG. 1 is designed on a common bus principle and includes an input (direction referenced to the processor 200) bus 60, and output bus 90, a functional command bus 70 and a selector bus 80. Each of the buses in fact comprises plural distinct conductors for conveying information in parallel form. As is also shown from the bus configuration in FIG. 1, substantially all of the major system subportions are connected to each of the system buses.

The input bus 60 is employed to supply information from each major subsystem to the central processor 200 when commanded to do so via the command bus 70, and when that subsystem is addressed by the selector bus 80, in the manner discussed below. Each subsystem is connected to the processor via the output bus 90 to receive information from the processor 200.

Each of the typewriter/editing subsystems (i.e., the control field 430, the typewriter 401, and the tape controllers 500 [but not the memory 300]) is operatively selected for communication with the central processor 200 by the selector bus 80. In particular, each of these peripheral subsystems is assigned a unique identification number and includes a combinatorial decoder which enables that equipment only when its particular code is then present on the selector bus. In the simplest case (described below) the bus 80 includes plural tracks in one-to-one correspondence with the peripherals so that each need respond only to a signal level on its associated single bus conductor.

Similarly, the command bus 70 designates for the peripheral subsystem selected by the selector bus 80 that particular operation to be performed by the peripheral. To illustrate, when it is desired to pass a character typed at the keyboard 420 to the processor 200, the processor identifies the typewriter 401 on the selector bus 80, supplies the "send character" functional command on the bus 70, and examines the input bus 60 to receive the character which has been gated thereon from the keyboard 420 by operation of the send character command. Similar common bus system functioning obtains as well for other system functional units.

To briefly illustrate the basic operation of the present invention with respect to the block diagram of FIG. 1, it will be assumed that an operator had depressed a record key on the field 430. This is supplied to the processor, operates as a program interrupt, and places the composite FIG. 1 equipment in a recording mode, beginning with a program address in the memory ROM to control character recording. Also, a "record" mode indicating lamp is illuminated at the field 430 to provide an attendant with status information.

An attendant at the keyboard types the text material in normal fashion. Every time a new alpha-numeric or keyboard control key character is depressed, a service request is communicated to the central processor 200. The typewriter 401 is then selected by the bus 80, a send character command issues on the command bus 70, and the character is entered in the processor 200 by way of the input bus 60. As the characters are sequentially received, they are accumulated in the processor 200 and memory 300. At the same time, the processor 200 generates the associated control information required for the characters being batched into a line of text (e.g., counts the characters in an "end pointer" character field and the like, more fully discussed below). When an entire line has been typed at the keyboard 420 (determined by the receipt of a carriage return control signal from the keyboard 420), the entire line stored in the memory 300 is communicated by the direct memory channel bus 50 for entry into the next available text line containing record of one of the tapes, e.g., the tape number 1 via the tape controller 500. This process continues until an entire document has been stored on the selected tape.

Further system processing must, of course, await the desires of a user. For example, in its most elemental aspects a user may simply require one or more reproductions of the stored document as originally prepared. This will be signalled by a suitable key actuation by the attendant at the control field 430. The basic information flow will then be a search of tape number 1 to find the document requested, followed by line-by-line direct memory channel flow from tape controller 500₁ to a buffer register in the memory 300 via bus 40. The information is then extracted from the memory 300 by the processor 200 and transmitted on a character-by-character basis to the print section 410 of the typewriter 401 through the output bus 90, the central processor 200 energizing the selector bus 80 to identify the typewriter 401 and supplying a "receive character" mode command on the bus 70.

More to the essence of the instant invention, however, it will typically be desired to edit the document originally stored on tape in some minor or major way. For such case, the edit mode signalling key is depressed at the field 430 to begin edit mode processing under control of the appropriate portion of firmware in the memory 300. To edit, an operator at the keyboard 420 transmits, ad seriatim, all of the editing statements (commands) desired for the entire stored document. These are processed and validated at the processor 200 as they are received, and stored in the bulk memory. In accordance with one aspect of the present invention, the editing commands during this operation (command input phase of Pass 1) may be stored on an edit track of the tape containing the original text material (tape number 1 for the assumed case). For completeness, it is observed at this point as well that the tape number 1 (and 2) advantageously contains a third track which repetitively stores in each character position of a record the serially assigned record number for rapid tape searching, the tapes 1 and 2 therefore advantageously comprising at least three tracks, one containing record numbers; one containing text material; and the third being the editing track.

After all of the editing materials have been stored on the tape, the editorial changes are in fact implemented by operation of the composite equipment. The processor 200 first operates both on the originally stored text, and on the stored editorial materials by "marking" the text records in accordance with the changes to be made to the lines of text there stored (marking phase of Pass 1 operation). The Pass 2 compiles, then operates on the marked text and edit records as source material to produce a revised stored document at tape number 2, i.e., one which includes all of the changes, that is, a series of storage records which would have been produced if the corrected document had been typed in the first place. This revised document may then be derived by simple power typing play back in the manner described above.

Figure 2:
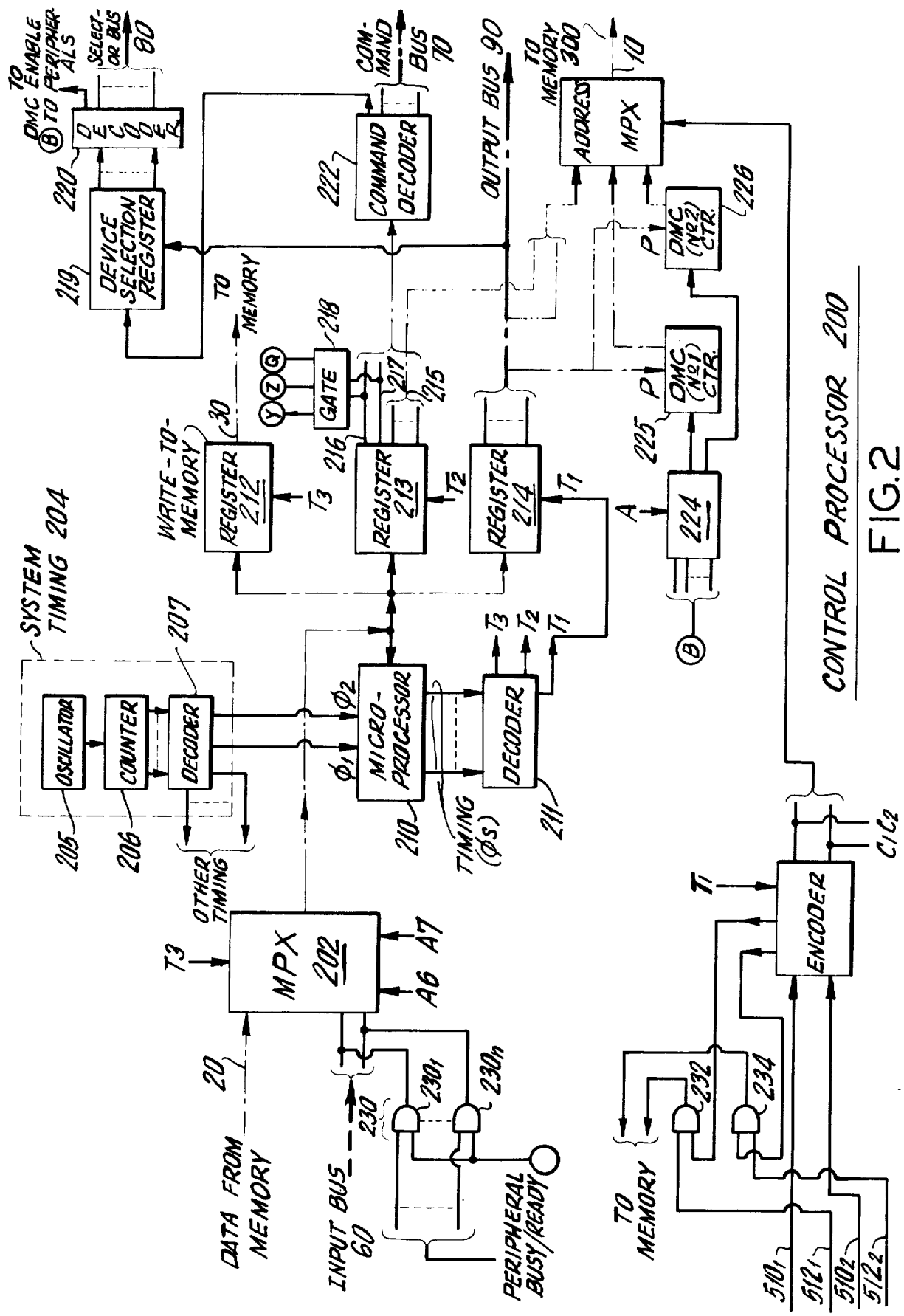

With the above described system functioning and block diagram overview in mind, reference will now be directed to the particular structure associated with the subsystems depicted in FIG. 1. Referring first to FIG. 2, there is shown a specific illustrative embodiment for the central processor 200. The processor 200 includes processor circuitry 210 which contains all of the structure necessary to respond to a fixed set of possible system commands or instructions, e.g., instruction decoder, instruction location counter, accumulator, arithmetic unit, timing registers, and the like normally associated with such a processor. Thus, the processor 210 may comprise any standard micro processor, e.g., the unit model 8008 vended by Intel Corp., Santa Clara, California. Micro processors in various forms are available form many of the MOS semiconductor manufacturers, and processors operatively connected to ancillary clocking and additional interface registers are available commercially as well.

System timing for supplying the requisite clock phases to the element 210, and for generating to other system timing functions as well, is available from a system timing network 204. Most simply, as well known to those skilled in the art, such circuitry may comprise an oscillator 205 cycling a binary counter 206 wherein the plural counter outputs are decoded by a counter-state decoder 207. Input signals to the processor 210 are supplied by a multiplexer 202 which connects the processor input to data supplied by memory via the bus 20 (see FIG. 1) or supplied via the input bus 60. The multiplexer selection is determined by time dependent variables developed as set forth in FIG. 2. Thus, during a portion of the operative cycle for the processor 210 data is fetched from memory via the bus 20 while at other mutually exclusive times, the micro processor receives its input from the data bus 60.

A service request lead 229 is supplied from each of the above identified system peripheral elements to the micro processor via the plural lead input bus 60 and time gated coincidence gates 230. Thus at yet another distinct time during operational system cycles when data is not otherwise present on the input bus 60, the service request leads 229 are coupled to the processor so that the processor is advised which of the peripheral units is active or busy, and which are requesting service. Thus, to illustrate, when a key is depressed at the keyboard 420 (FIG. 1), a service request signal is communicated by a corresponding one of the loads 229 to the processor 210 to inform the system that a key has been depressed and that the typewriter thus has information to provide. Accordingly, the processor responds to this by initiating proper action to interrogate the keyboard in the manner discussed herein such that the information identifying the key depressed will be received in the processor. Additional state cycle timing signals are developed by the processor 210 and supplied to a decoder 211 which provides output signals $T_1, T_2 \ldots$ to identify the particular operative state of the processor 210 for clocking and gating purposes. The distribution of these timing signals is shown in FIG. 2.

Information generated as a result of data management and computation in the processor 210 is supplied at varying system times to three registers 212, 213, and 214, the registers being enabled by the timing signals shown. The contents written into the register 212 correspond to "write-to-memory" information and is supplied to the memory 300 via the bus 30 (FIG. 1). The address to receive the information is loaded into registers 213 and 214, and supplied to the memory 300 via the multiplexer 228 and bus 10. It will be appreciated that the intricacy of FIG. 2 is required because the particular illustrated micro processor 210 corresponds to an eight bit machine requiring two eight bit registers 213 and 214 if a relatively large number of storage addresses (e.g., 2$^{14}$) are to be accommodated. This complexity may be obviated by employing more powerful (e.g., 16 bit) processors, at an increased cost.

Dependent upon the particular functional mode then being implemented by the composite central processor 200, the contents of registers 213 and 214 may attain a different significance. Thus, as above described, the contents of these registers may comprise an address for a memory read or write operation. Then also, the contents of the register 214 directly comprises output information to be impressed on the output bus 90 for selective communication to the subsystem peripheral units. The contents of register 214 also selectively load a device selection register 219 which is enabled by a particular output of a decoder 222. The output of register 219 is decoded by a decoder 220, the outputs of decoder 220 comprising the selector bus 80 (FIG. 1). More specifically, during non input/output functioning, the decoder 222 enables the register 219 and loads therein the identity (i.e., code number) of the peripheral which is to be given a functional command by the composite processor 200. This content of the register 219 is decoded at unit 220 and supplied as a one-of-n output code on the bus 80 to operatively select for action the peripheral identified by the contents of the register 219.

Register 213 is loaded by the processor 210 with information sometimes comprising a portion of the address (the most significant six bits of a fourteen bit address) in memory to be accessed in the manner above described. During other operational commands, the contents of register 213 comprise operation codes for the various peripherals. A subportion of the output of element 222 thus comprises operational commands to be supplied to peripherals (i.e., the bus 70 of FIG. 1), additional leads being used internally in the central processor to control internal processor functions such as the register 219 above discussed. Moreover, register output leads 216 and 21 ($A_6$ and $A_7$) are used in conjunction with a decoder gate 218 to generate additional internal selection signals used for purposes herein discussed and shown in FIG. 2.

The central processor 200 also includes apparatus associated with the control of the direct memory channels, i.e., the bilateral communication of information between the memory 300 and the tape and tape controllers 500. To this end, the processor 200 includes counters 225 and 226 respectively associated with the tape controllers $500_1$ and $500_2$. When a direct channel memory operation is to begin, the appropriate counter 225 or 226 is preset (P-input terminals) by the register 214, only one of the counters being enabled to receive the preset inputs by a decoding gate 224. The preset inputs to the appropriate counter 225 or 226 correspond to the beginning record address of the particular storage record on tape to which the direct memory transfer is to operate. Each time an additional record is to be transferred, an appropriate timing signal ($A_0$) is supplied to toggle the operative counter input. The output states of the counters 225 and 226 comprise additional inputs to the memory address multiplexer 228 which selects an appropriate one of the direct memory channel counters or the registers 213 and 214 to supply memory address information on the bus 10.

The selection between the appropriate one of the direct memory channels 1 and 2 is made via an encoder logic network 236. It will be appreciated that during some system operations both of the direct memory channels will be operative, i.e., that there will be a transfer of information between the memory 300 and both of the tapes and tape controllers $500_1$ and $500_2$. This will obtain for example during Pass 2 operation when information is being extracted from the controller $500_1$ to memory and other data corresponding to the revised document, is being supplied from another memory location to the tape and controller $500_2$. To this end, service requests input lines $510_1$ and $510_2$, which reflect the bus/ready-to-receive data status of the respective tape controllers are supplied to the encoder-logic network 236. During direct memory control operation (assumed to occur during the $T_1$ time interval when there cannot be contact between the central processor 200 and memory 300 for reading or writing), the encoder supplies at its output $C_1$–$C_2$ signals to the controller input port of the multiplexer 228 which selects between the direct memory channels associated with tapes 1 and 2, thereby also selecting between the direct memory channel counters 225 and 226.

As an additional input from each of the controllers $500_1$ and $500_2$, there is supplied an additional status input lead $512_1$ and $512_2$ which apprises the central process whether the respective tape controllers $500_1$ and $500_2$ are in a read or a write mode. These mode signals are operated upon in coincidence gates 232 and 234, together with an internal signal produced by encoder 236 (the internal signal supplying the information that there is data and that the $T_1$ interval obtains) for supplying control signals on leads 261 and 263 to memory 300 for purposes below discussed.

Figure 3:
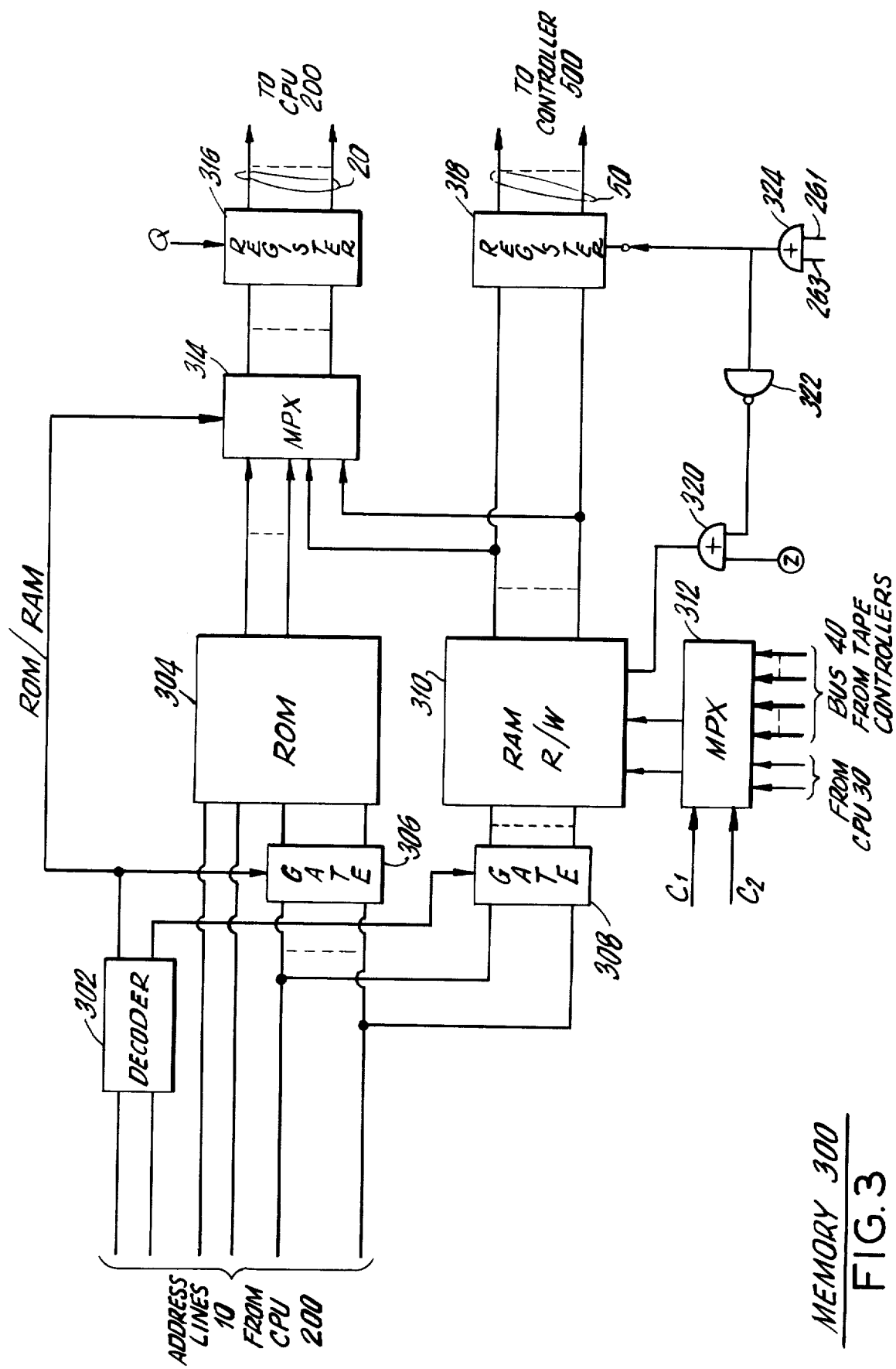

Referring now to FIG 3, there is depicted the system memory 300. Among its basic constituent parts, the memory 300 includes the fixed contents of a ROM 304 (the program), and the variable storage contents of a read/write RAM 310. The memory 300 subportions 304 and 310 are addressed by the address input lines 10 from the central processor 200, gates 306 and 308 and a decoder 302 being provided to distribute addresses between the ROM and RAM. It will be appreciated, however, that the memories 304 and 310 may be combined into a single read-write memory structure, e.g., one or more magnetic core planes. The use of the ROM was chosen because the software thereby provided is not subject to destruction or overwriting in real time service, although ROM usage requires an extra initial design expense for marking (unless PROMs are used).

The decoder 302 supplies an output signal which indicates whether the ROM or RAM is being accessed (i.e., an operand or an instruction), permitting the information read out from the selected one of the RAM or ROM to pass through a multiplexer 314 to an output register 316 for communication via the bus 20 to the central processor 200. The contents of the register 316 are gated out to the central processing unit at the proper time under control of the Q timing signal generated at the output of gate 218 (FIG. 2). Such communications occur for example, when a next instruction is to be read from the ROM 304, or when a line of text is to be read from the RAM 310 to the central processor for operation thereon or communication therefrom to the typewriter output 410.

Similarly, the RAM output is loaded into a register 318 for communication to an appropriate one of the two tape control units 500 via the associated bus 50 when the memory is operated in a direct memory channel mode for communications from the memory 300 to the equipment 500. This is effected when the direct memory channel operation signalling potential appears on lines 261 or 263 from the central processor 200, and is passed by an OR gate 324 to enable an output from the register 318. Of course, the gates 324 and the like may be phycially included within the processor 200.

Finally, it is observed that the read/write RAM 310 must be written as well as read. To this end, a multiplexer 312 passes information from one of three possible input paths to the write input terminals of the RAM. The three inputs comprise the bus 30 from the central processor 200; and the input buses 40 from the two tape controllers $500_1$ and $500_2$. A selection between the three input arrays is made under control of the information provided by the $C_1$ and $C_2$ input leads which identify when a particular one of the direct memory channels is operatively supplying information to the memory 310, or that such information is provided by neither of such channels and thus is coming from the central processor 200.

Finally, it is observed that the RAM 310 is enabled by the output of gates 320, 322 and 324 for a writing mode when a memory write operation is in effect (logically, timing supplied by the gate 218 of FIG. 2; or when a direct memory channel is in a write mode of operation [the gate 320 enabled via the gates 324 and inverter 322]).

Figure 4:
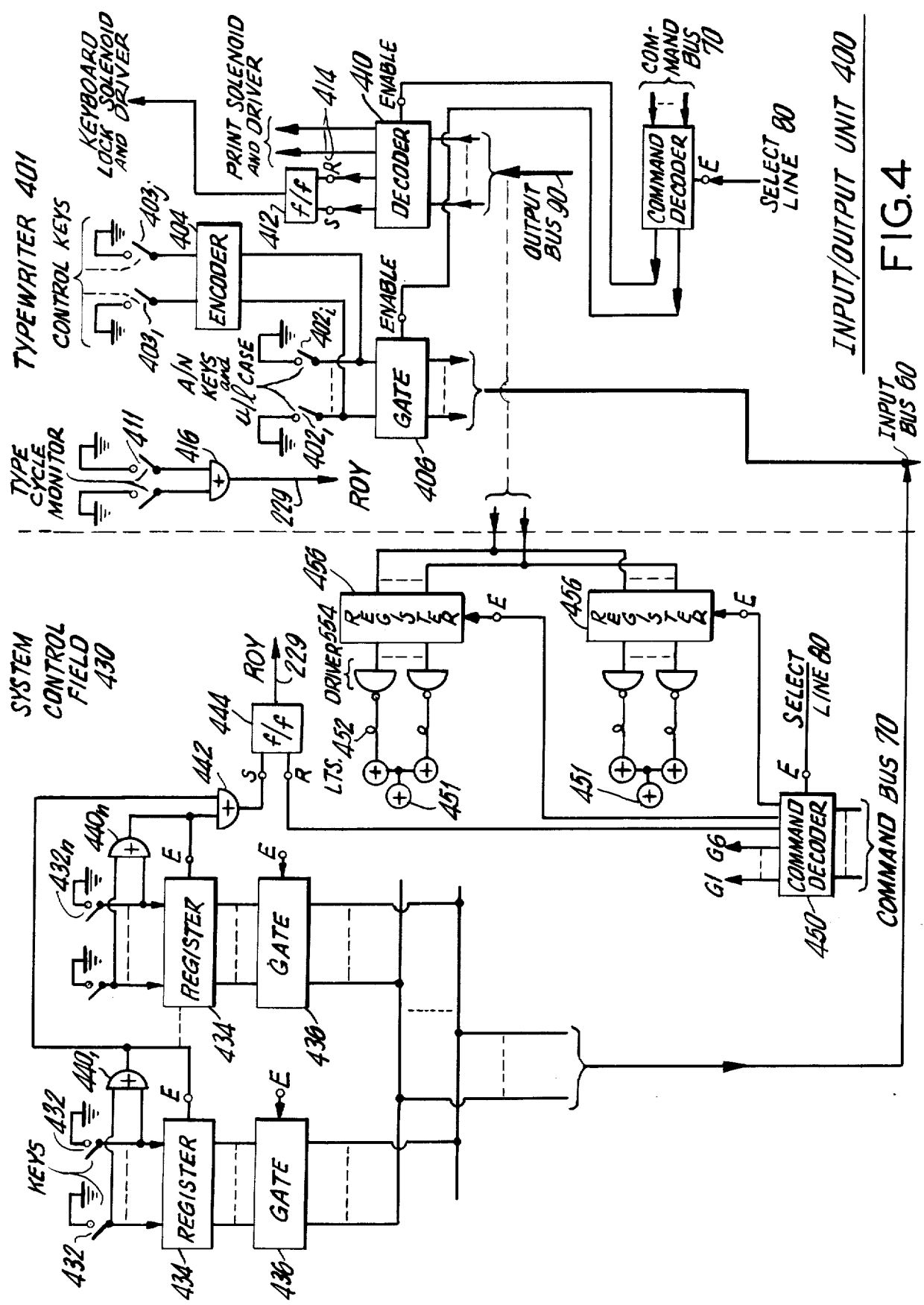
FIG. 4 illustrates input/output equipment 400 for the system organization depicted in FIG. 1.

Attention will now be directed to FIG. 4 which schematically depicts the structure associated with the input/output apparatus 400 of FIG. 1. Examining first equipment associated with the typewriter 401 (to the right of the vertical dashed line in FIG. 4) there are shown a plurality of form A contacts $402_1$–$402_i$ which selectively supply an encoded signal pattern to a gate 406. The contacts 402 are shown in the drawing as selectively applying either a ground or high impedance open circuit to the gate 406 as required by conventionally employed current sinking digital logic. The switches 402 provide a particular contact closure pattern to identify which one of the alphanumeric keys (upper or lower case encoding also being provided) on the typewriter keyboard 420 has been actuated. The switch closure may assume various corporal implementations as discussed above, e.g., reed switch contact closures caused by movement of a selected subject of magnet actuators responsive to any key depression; interruption of a light path from a light emitting diode to a silicon photo detector, or the like. Further, the typewriter control keys (carriage return, back spacer, and so forth) each actuate a particular one of plural switches 403 which energize an encoder 404 to also supply a key identifying encoding to the gate 406, there being shown a wired OR connection between the outputs of the encoder 404 and the leads connected to the switches 402.

The electronic typewriter machines include internal physical mechanisms which indicate when any key has been depressed. For example, the Selectric machine includes a shaft which revolves responsive to depression of any key. Sensors are employed to detect the incidence of depression of any key to activate one or more contacts 415 in the manner above discussed. Any one of the closed contacts 415 passes through the disjunctive logic gate 416 to thereby signal the ready/busy status of the typewriter 401 to the micro processor 210 by the appropriate associated one of the leads 229 and gates 230 (FIG. 2).

The above-described functioning with respect to the key switched 402 and 403, the encoder 404, and the gate 406 obtains whenever information is transmitted from the keyboard 420 to the central processor 200. To implement such operation, the availability of information to be transmitted (the "ready" signal) is received by the processor 200 which then selects the equipment 401 by loading the device selection register 219 with the code of the typewriter 401. The decoder 220 (all in FIG. 2) thereby activates that one of its selector bin output leads 80 associated with the typewriter 401, thereby enabling a command decoder 405 of FIG. 4. Also passing to the command decoder 405, on the command bus 70, is the operation code of a command for passing information from the key (and switches 402) to the input bus 60. The combinatorial decoder 405, enabled by the one line of the bus 80 shown in FIG. 4, thus responds to the command on bus 70 by enabling gate 406 to thereby pass the key identifying encoded information onto the input bus 60 for transmittal to the central processor.

Similar operation occurs when a character is to be printed by the typewriter 401 print portion 410. To this end, the processor 200 impresses on the output bus 90 (via register 214) the coded identity of the character to be transmitted. This information is transmitted to a decoder 410 at the typewriter control equipment 401 (FIG. 4). The decoder 410 is enabled by a select line 80 (shown in FIG. 4) which identifies the typewriter 401 as the recipient of the command being processed (activating a decoder 405), also supplying the "character output" mode command on the command bus 70. The command decoder 405 accordingly enables the character decoder 410.

The decoder 410 responds to the character received on bus 90 by enabling an appropriate one or ones of solenoid(s) and driver(s) to cause the printing mechanism to print the appropriate character. In essence, the solenoids mechanically position driven linkages which cause printing in a manner corresponding to that which would obtain if the corresponding key were depressed at the keyboard 420. Again, however, solenoids, drivers, and the like may be purchased for the above identified IMB Selectric machine from the IBM Company.

In some instances also, it is desired to isolate the typewriter keyboard 420 from the print mechanism 410. Thus, for example, during automated power typing, it is desired that the keyboard have no effect and not cause printing. To this end, the decoder 410 is enabled as above described, and responds to a "beginning of print lockout" code pattern on the output bus 90 by setting a flip-flop 412. The set flip-flop activates a solenoid and driver which locks the keyboard. Similarly, when the lock out operational period is over, another particular output code on the bus 90 together with the appropriate selector and command bus 80 and 70 signals, resets the flip-flop 412 via the decoder 410 to again permit the printing section 410 of the typewriter to perform directly responsive to depressing keys.

Shifting now to the left portion of FIG. 4, there is shown the system control field 430 which includes key (or other) switches for supplying information from the keyboard 430 to the central processor 200, and lights for registering information (operational mode identification) supplied to the field 430 by the central processor. Operation of the system control field 430 closely follows that described above with respect to the typewriter 401. In particular, a plurality of contacts 432 close responsive to depression of the control keys, and this information is preserved in registers 434 which are enabled via an associated OR gate 440 whenever any one of the switches (keys 432) associated therewith is energized. Two level OR logic (the gates 440 each of which drives an OR gate 442) sets a flip-flop 444 to supply a service request to the central processor 200 through one of the conductors 229.

The field 430 is polled by issuing an appropriate peripheral identification to the selection register 219 causing the select line 80 shown in the left portion of FIG. 4 to enable a command decoder 450. The command on the command bus 70 then causes the decoder 450 to enable the gates 436 to gate the information contained in appropriate one of the registers 435 onto the input bus 60 for communication to the central processor. After the gates 436 have been pooled, an appropriate command on bus 70 causes the flip-flop 444 to be reset.

Similarly, the control field 430 includes a number of system status indicating lamps 452. These lamps are driven by registers 456 and buffer-drivers 454, the registers being set by data on the output bus 90 in accordance with register enabling outputs of the decoder 450 pursuant to a select line 80 energization and an appropriate command on the bus 70.

Figure 5:
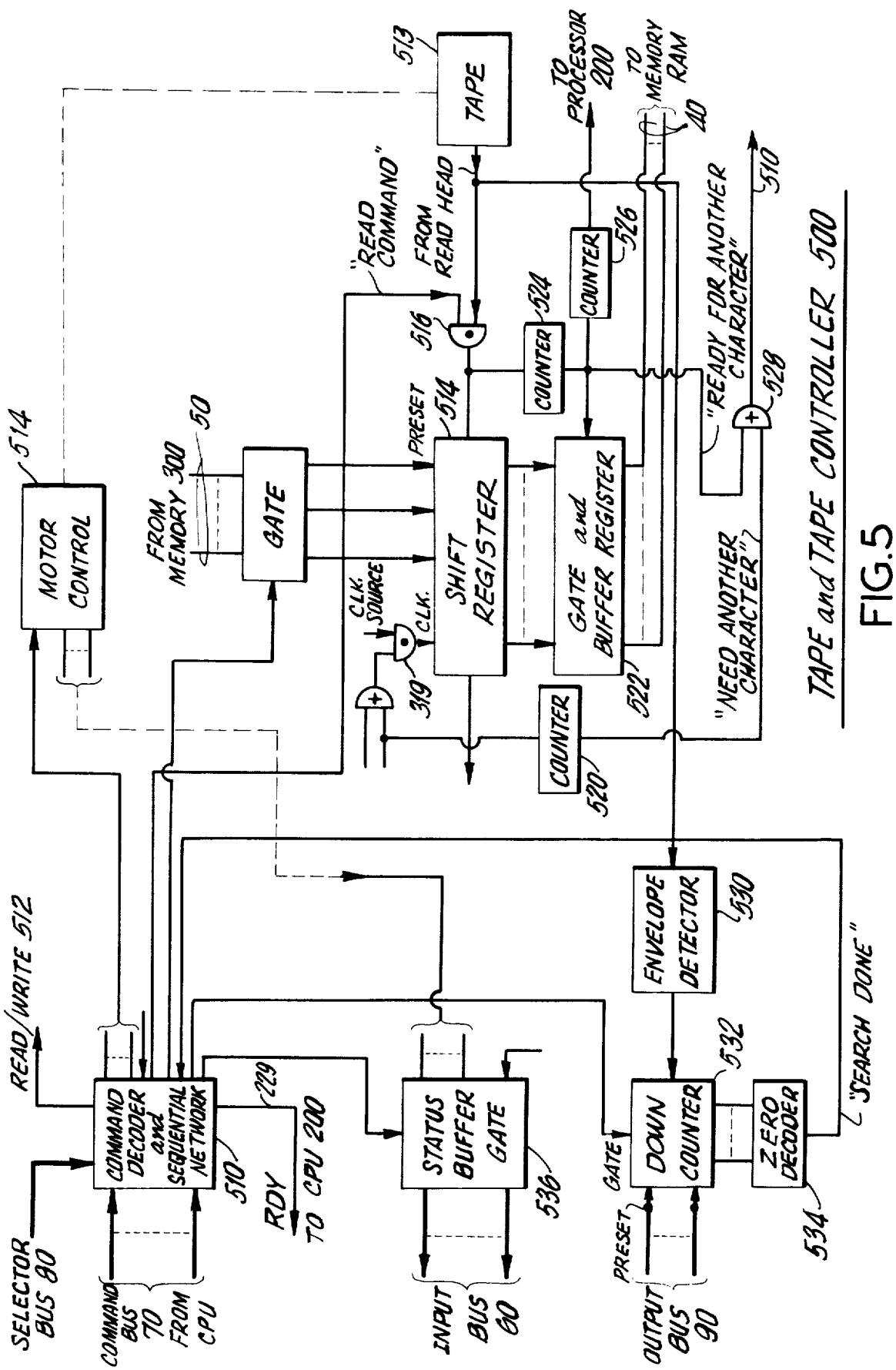
FIG. 5 depicts tape and tape controller apparatus 500 employed in the system organization of FIG. 1.

As a final overall system hardware subcomponent, a tape and tape controller 500 is shown in FIG. 5, it being understood that the structure of FIG. 5 is employed for each of the two tapes employed in the present invention. Moreover, it is recalled that the peripheral stores 500 may be made part of one or more general memories, e.g., if core storage is available and not otherwise utilized. This detracts from system flexibility (e.g., the indefinite nonvolatile preservation of an arbitrarily large number of documents at minimal cost).

In its basic aspects, each subsystem 500 includes a magnetic storage medium such as magnetic tape (reel, cassette or the like) on its transport, the ensemble being identified by reference numeral 512 and generally referred to herein as "the tape". Commands are supplied to the composite controller 500 for signalling the transport and the transport motor controller 514 of the mode desired (e.g., read, write, rewind, fast advance, search, or the like). Data is either supplied to and stored on the tape from the memrory 300 on bus 50, or is read from the tape and supplied to memory on the bus 40. Also, the status of the controller 500 is signalled to the processor 200 during an appropriate time via the input bus 60.

In particular, as is standard for all of the peripheral subsystems associated with the central processor 200, a particular one of the selector bus lines 80 enables the controller by enabling a command decoder and sequential network 510 therein. Also supplied to the decoder, as before, is the functional mode input command impressed on the command bus 70. Data in the output bus 90 is employed to preset a counter 532 with a particular number of records (i.e., lines of text) to be written onto tape or read from tape.

To illustrate, assume that a read-from-tape operation is desired. The tape select line 80 enables the command decoder 510, and the read operation is identified by the code pattern on the command bus 70. An output from the network 510 gates the number of records for which reading is desired, present on the output bus 90, into the down counter 532. Further, an output of the decoder and sequential network 510 enables the motor controller 514 to mechanically drive the tape 512.

The fact that a read mode of operation is in progress is signalled by the decoder 510 to partially enable an AND gate 516, thereby passing information from the read head of the tape 512 through the AND gate and into shift register 514. Clocking for the shift register 514 is provided by an OR gate 318 which enables an AND gate 319 having one input connected to a clocking pulse source. As each character is read from the tape 512, the plural bits of the character propagate through the shift register 514 and are counted in a counter 524.

When the proper number of digits for a complete character are noted by the counter 524, a gate and buffer register 522, e.g., a conventional latch, receive the (parallel) output of the shift register thereby storing the character. The character is then available for communication to the memory RAM 310 via the direct memory channel bus 40. An additional counter 526 is employed to count the number of output pulses from counter 524 and to supply a signal to the central processor to indicate when a full record has been read.

The output binary wave train read from the tape 512 is also envelope detected by a detector 530. The envelope detector is constructed with a slow responsive time so it cannot respond to the difference between binary ones and zeros in the information pulse train during reading. However, the envelope detector 530 does respond during the period between records when there is an extended strain of zeros, and thereby generates an output pulse which down-toggles the counter 532 at the end of each line. This procedure iteratively continues until the number of records desired (corresponding to the initial contents preset into the down counter 532) are supplied. At such time the contents of the counter 532 are zero- and this is detected in a zero detector 534 (a simple AND gate) which signals the completion of reading to the sequential network 510. The network 510 then shuts down the motor 514 and the composite equipment 500 awaits the next requisite function.

It is observed that the "status" of the composite controller 500, e.g., a micro switch signalling whether or not a tape cartridge is in place, the state of the motor drive 514 (typically comprising the status of a mode flip-flop) and the like, is loaded onto the input bus 60 via a buffer gate 536 when the status register is polled by the central processor 200. Also, the usual peripheral ready/busy status signal is communicated to the central processor 200 via a lead 229.

For a write mode of operation, information from the memory RAM 310 is supplied to the controller 500 via the bus 50 and passed responsive to a write command through a gate 515 to preset the several individual stages of the shift register 514 (alternatively, separate shift registers may be used for reading and writing). The information is then serially clocked out of the shift register (schematically to the left in FIG. 5) for supply to the tape write head for recording. As before with respect to tape reading, the necessary motor control and the like is effected by the network 510, and controller 500 status is available upon inquiry by the central processor unit via the input bus 60.

Further, it is observed than an OR gate 528 provides the direct memory channel service request signal 510. In particular, the gate 528 selectively signals when the direct memory channel is ready to process another character, as signalled by either the output of the counter 524 (tape reading) or by the output of a comparable counter 520 (tape writing).

With the above described hardware system in mind, attention will now be directed to the basic illustrative program sequences which give rise to the substantial text flow between the input/output equipment 400; the central processor 200; the memory 300; and the tape equipment 500. Discussion will first be had of the major stored program subroutines which effect the data transfer between the several system equipment items. This will be followed by illustrative processing of a document during editing to depict Pass 1 (command input and marking portions) and Pass 2 processing.

As a principal affair, it will be clear from the discussion above that data must be transferred between the equipment items set forth in FIG. 1, i.e., the typewriter 401, the central processor 200, the memory 300 and the tape 500. Before presenting the manner of data processing for effecting this, several matters will be noted. As above discussed, it is assumed that the structure 200 is implemented by a small eight-bit micro processor and, for purposes of concreteness only, the MOS central processor model 8008 vended by the Intel Corp. The ensemble of instructions and internal configurations for this micro processor are more fully set forth in the Intel Data Catalog, February 1973, the disclosure of which is incorporated herein by reference. The Intel processor includes a series of registers denoted A, 1 through 4, H and L. The A register may be thought of as the accumulator, and the H and L registers store the most and least significant digits of memory addresses during memory transfer operations. Again as noted above, however, the use of an eight-bit micro processor and related structure increases hardware and program complexity by reason of its limited capabilities, but at a savings in hardware costs. It will be readily appreciated by one skilled in the art that the principles of the present invention are applicable to any digital computing configuration, more powerful computers and processors simply providing an ease in programming and reduction in the sophistication of the equipment required external to the processor, but at an increased cost for the more powerful equipment. It will also be appreciated by those skilled in the art that the mnemonic 8008 programs employed herein may be replaced by any other program language without departing from the spirit and scope of the present invention.

We treat first, now, the transfer of information from the central processor 200 to the memory 300 — a subroutine styled ADDCH (an acronym for "add character to buffer"). Thus, it will be assumed that a character, e.g., the last character typed at the keyboard 420, is stored in register 1 of the micro processor, and that the address of the RAM buffer in memory to receive the character of the line being assembled is stored in register 2. The instructions are:

| | |
|---|---|
| MOV 2, H | (1) |
| MOVI L | (2) |
| 203 | (3) |
| MOV MEM,A | (4) | first cause the end pointer of the text line being assembled (in essence comprising a count of the characters in a line) to be moved to the accumulator (A register). More particularly, the first move instruction shifts the contents of register 2 (the RAM buffer address) into register H. The next following move immediate instruction (2) loads the register L (storing the least significant memory address portion) with the octal number 203 which corresponds to the end pointer storage location in all RAM buffers. Finally, the move instruction (4) loads the accumulator A with the contents of the memory address whose address is defined by the contents of registers H and L, i.e., the end pointer of the particular line being processed. At this point, the end pointer is thus stored in the accumulator.

Instructions (5) – (9):

| | |
|---|---|
| CMPI | (5) |
| 376 | (6) |
| JMP PL | (7) |
| (H) | (8) |
| (L) | (9) | in essence comprise a test to shift program control to an address defined by the H and L register loading address portions of instructions (8) and (9) if the end pointer exceeds its upper permissible bound, e.g., 376 octal, corresponding to a maximum 128 character line. To execute this, a compare immediate instruction (5) compares the contents of the accumulator A with the octal number 376, and the following jump on plus instruction (7) causes a program transfer to the address defined by (8) and (9) if the subtraction of 376 from the accumulator improperly has a positive difference (the error condition).

Assuming, as is the usual case, there is no overflow,

| | |
|---|---|
| ADDI | (10) |
| 1 | (11) | add immediate instruction (10) adds the number one of instruction (11) to the contents of the accumulator A, thereby increasing it by one to reflect the fact that additional character is being added to the line.

The next following instructions

| | |
|---|---|
| MOV A, MEM | (12) |
| MOV A, L | (13) |
| MOV 1, MEM | (14) |
| RETURN | (15) | employ indirect addressing (instructions [13] and [14]) to store the character typed at the keyboard 420 and stored in the register 1 in the next available memory character slot in the line (record) being assembled. In particular, instruction (12) again stores the updated and pointer in its original prescribed position, while instruction (13) loads the memory address register L (least significant) with the value of the end pointer, which comprises a relative address from the beginning of record storage for the new character. Finally, instruction (14) causes the contents of register 1 (the character typed) to be stored into the proper memory location whose address is preserved in the address registers H and L.

The RETURN instruction (15) terminates the subroutine, causing program control to return to the next operation desired, the character having been moved from the central process 200 to memory in a proper location, with an updated end pointer.

It will again be appreciated by those skilled in the art that the extended series of instructions to implement the central processor-to-memory transfer will be greatly shortened by use of a more powerful machine, and that the program may be more simply written in another language and also reduced in scope where a larger (e.g. 16 bit) processor is employed. Among other things, the use of such a larger processor would permit all addressing instructions to be executed in a single step without having to load high and low address portion containing registers H and L.

The remaining data transferring subroutines will only be briefly and schematically discussed. A routine styled SELIN ("obtain input from Selectric") is employed to propogate one character typed in at the keyboard 420 to the central processor 200, loading that character into the micro processor 210 register 1 from which it may be transferred to buffer RAM storage by the ADDCH program above discussed. The full expansion of this SELIN routine is set forth in instruction 70-232 in the program listing annexed hereto and made part of this disclosure (the above described ADDCH routine may be found at instructions 544-566). At the kernel of the SELIN program is:

|         |      |
|---------|------|
| MOVI A  | (16) |
| 3       | (17) |
| DOC7    | (18) |
| DIA     | (19) |
| MOV A, 1| (20) |

The move immediate instructions (16) and (17) load the peripheral device identifying code of the peripheral being addressed ("3" for the typewriter 401) into the A register. Instruction (18) addresses the device identified by the contents of the A register (the typewriter), i.e., loads its unique code into the device selection register 219 to enable the typewriter 401 via the decoder 220 of FIG. 2. Instruction (19) is an input instruction loading the character transmitted by the selected peripheral (in this case the character typed at the keyboard 420) into the A register of the micro processor 210 over the input bus 60. Finally, the move instruction (20) translates the character from the A register to the 1 register.

A TPWR subroutine transfers data via a direct memory channel from the RAM buffer store 310 to a tape and tape transport 500, this routine being fully set forth at instructions 2065-2145 of the program listing. To again schematically illustrate processing of this program, assume that the numerical identity assigned to the number 1 and number 2 tape controllers 500 is "4" and "5", respectively, and that the tape number 4 is to receive the contents of the buffer. Instructions (21) – (23)

|        |      |
|--------|------|
| MOVI A | (21) |
| 6      | (22) |
| DOC7   | (23) |
| ...    |      | operate in a manner similar to instructions (16) – (18) above, i.e., load the A register with the assumed identity "6" of the desired direct memory channel (which is treated in this respect like a peripheral), causing this channel to be seized over the selector bus 80.

Instruction (24)

|         |      |
|---------|------|
| MOV 2,A | (24) |
| DOC     | (25) | moves the address of the RAM buffer (assumed to be contained in register 2) to the accumulator A, and the output instruction (25) loads the direct memory channel with the buffer address.

Instructions (26) – (28)

|        |      |
|--------|------|
| MOVI A | (26) |
| 4      | (27) |
| DOC7   | (28) |
| DOA    | (29) | operate as above described to connect the desired tape transport number 1 ("4" code) for operative use with the memory 300, and the output instruction (29) causes the transfer of the information as desired.

A tape read subroutine (TPRD), which reads information from tape into a RAM buffer, performs in a manner parallel to the tape write operation (TPWR) above described and will not be repeated, the operative instruction corresponding to TPWR order (29) is replaced by an operation code which causes a reverse flow of information. Direct memory channel addressing, and selection of the peripheral for operation proceeds as above described. Particular coding for the Intel 8008 micro processor for the tape read subroutine is set forth at statements 2003-2065 in the program listing.

A REDFW routine transfers a character of information from a RAM buffer to the central processor 200 and is substantially similar to the ADDCH routine set forth in detail above, there being an inverse direction flow. The routine is conceptually similar to instructions (1) – (13) above, instruction (14) being inverted, e.g., to the form

|           |      |
|-----------|------|
| MOV MEM, 1| (30).|

Finally, a routine OTPCH is employed to output one character from the central processor 200 to the print portion 410 of the typewriter 401 via the output bus 90. Again, this is operational sequencing in inverse to the SELIN routine above described, OTPCH being set forth at coding statements 350-446. To schematically illustrate the essential operation of this routine,

|         |      |
|---------|------|
| MOVI A  | (31) |
| 3       | (32) |
| DOC7    | (33) |
| MOV 1,A | (34) |
| DOA     | (35) | move immediate instructions (31) and (32) load the accumulator with the identity ("3") of the typewriter 401 which is then operatively selected for communication to the central processor by instruction (33). Instruction (34) loads the accumulator from the input/output register 1, and the contents of the accumulator are then supplied via the output instruction (35) to the output bus 90 for transmittal to the print portion 410 of the typewriter 401.

The above discussion has thus characterized the data flows for the composite system of FIG. 1. Of course, character assembly into lines; disassembly from lines for outputing purposes; character manipulation for editing; and the like is effected under control of the processor 200, operand records being transferred from tape to RAM buffers as required.

With the above structure and data translation in mind, a specific example of operation of the composite arrangement of the instant typewriter/editing apparatus will now be presented. Assume that an operator at the input-output unit 400 of FIG. 1 depresses a record control key at the field 430 to place the system in a record mode and types the text:

"The quick brown fox the green fence has jumped over".

The typed text material, character-by-character and control key-by-control key is serially received at the central processor 200 in the manner above described, assembled into lines, and then stored on one of the tapes, e.g., the tape 1. The stored format of the three lines on the data track of the tape is as follows:

TABLE I

| Tape No. 1: Character Position No.: | 1 | 35 | 10 | 15 | 20 |
|---|---|---|---|---|---|
| Record No. 3 (data track) | [20][0]The *quick*brown*fox(CR) | | | | |
| Record No. 4 (data track) | [16][0]the*green*fence(CR) | | | | |
| Record No. 5 (data track) | [16][0]has*jumped*over(CR) | | | | |

Examining in detail data track record No. 3 associated with the first line of text (Table I), the first character position of the alloted 128 character record (eight bits per character) has a number stored therein which identifies the total number of alpha-numeric and control keys typed in the stored line of text. This above-discussed "end pointer" thus corresponds to the number of the 128 possible character spaces operatively used. Counting the number of letters in line 1 of the text above, including a character allocation for each inter-word space (schematically shown by an asterisk in the Tables) and an additional character space required for the carriage return control key signal struck at the end of this and every line, it is observed that there are twenty such. Accordingly, the contents of the first end pointer character storage space in record 3 is the numeral "20".

The second space in each record — also an administrative character allocation, is employed to list the total number of editing commands added to the original text material during the Pass 1 marking (editing) operation in a manner discussed below. Since the material considered here has just been typed and is as yet unedited, the central processor 200 loads the second space with a zero upon initial text recording.

It is important to observe also that record No. 3 shown in Table I represents the text track only. In each character space on the record No. 3 address track (parallel to the text track), the record number "3" is advantageously repeated in each eight digit character space for rapid tape advancing (search) purposes as above discussed. There is also record No. 3 of an editing track on the tape 1 parallel to the text track of Table I. At this time, the editing track does not contain any meaningful information.

Also shown above are the text tracks for record Nos. 4 and 5 upon initial typing. These are prepared in a format identically paralleling that for record No. 3 discussed above.

For administrative programming purposes there is also prepared a tape directory record and a document directory record (e.g. stored in the text track), the former being the first record of any tape and the latter being the first record of any stored document. The contents of each directory may vary in accordance with the preferences of those skilled in the art. Thus, the tape directory track may include serial character spaces which comprise the end pointer for the tape directory, i.e., the number of characters operatively used in the tape directory record; the tape identification number; the address of the next available free record to begin a new document; and plural characters identifying the record address of the beginning of each document. Similarly, the administrative document directory record at the beginning of each document may comprise an end pointer loaded with the number of actively used characters of that record; and successive characters loaded with the record addresses which begin each successive page of text in the document.

With the originally typed text materials stored on tape No. 1 in the manner set forth above, it will typically be desired to change or edit the text in some manner — either to correct errors or to reflect a changed preference of the text prepared. For the instant case assume, for example, that the word "brown" is to be deleted from line 1; that the word "jumped" in line 3 is to be changed to "leaped"; and that line 3 of the text is to be moved to precede line 2.

Accordingly, an attendant at the console depresses an edit mode key at the field 430 to provide a system interrupt indicating that an edit mode cycle of operation is to begin. As above described, the attendant then supplies as inputs to the central processor 200 via the keyboard 420 all of the editorial changes desired, on a batched basis, before any of the editorial changes are in fact actually implemented by the composite FIG. 1 system. To this end, Table II illustrates the process of edit command entry.

TABLE II

| Edit Mode: Pass 1 Command Input | |
|---|---|
| Computer Generated | Operator Generated |
| 01: | D, P1, L1,/brown*/(CR) |
| 02: | R,P1,L3,/jumped/(CR) |
|  | WITH,/leaped/(CR) |
| 03: | M,P1,L3,/h/(CR) |
|  | T0,P1,L3/(CR) |
|  | /(CR) |
|  | T0,P1,L1/(CR) |
|  | /(CR) |
| 04: | END |

TABLE IIA

| Computer Generated | Operator Generated |
|---|---|
| 02: | R,P1,L2,/jumpd*/(CR) WITH,/leaped/(CR) |
| ERROR | |
| 02: | |

The computer types out on a piece of paper loaded into the typewriter print portion 410 the notation "01:", asking for the first change. The attendant at the console types "D, P1, L1,/brown*/(CR)". See, for example, E. Story, U.S. Pat. No. 3,711,862 issued Jan. 16, 1973 for an example of such a widely employed computer-attendant exchange, the disclosure of which is included herein by reference.

In the format anticipated by the processor, this first edit instruction is interpreted to read delete, beginning at page 1, line 1, the material "'brown' and its following space". The following carriage return in this case signals to the computer that the first editorial change has been fully entered. The stored Pass 1 instruction verifies that this is a proper editorial command, i.e., confirms that the command is of a proper format, and that the text within the slash marks in fact exists in the referenced page and line. Upon such verification, the first ("01") change is entered into the tape edit track — in part in edit track record No. 3 and in part in edit track record No. 4 (this may of course be varied with the preference of one skilled in the art). The contents of the edit track of records Nos. 3 and 4 after processing of the first ("01:") edit command by the command input portion of Pass 1 operation is shown in Table III.

TABLE III

Tape No. 1:
Character Position No.:    1    5

| | |
|---|---|
| Record No. 3 (edit track) | [7][0]D,P1,L1 |
| Record No. 4 (edit track) | [8][0]brown*/(CR) |

At this time, no change is made to the corresponding data record No. 3 which remains in the form shown in Table I.

Having stored the editorial material corresponding to the first change, the system next prints out "02:" signalling the operator that the next change may be entered. As above discussed, this changes "jumped" in line 3 of the text to "leaped". The attendant therefore types a statement in the form shown in Table II, which corresponds conceptually to replace at page 1, line 3, the word "jumped" with the word "leaped". This change command is then verified and stored in the manner above described. Similarly, the system console 410 then asks for the next (third) change and the operator enters the command shown after "03:" in Table II. Statement 3 mnemonically corresponds to move the material of page 1, line 3 beginning with h to page 1, line 3 after the carriage return (signalled by the carriage return key depressed between slash marks).

Finally, when the next ("04:") change is asked for by the processor 200 via the typewriter print portion 410, the operator signals that there are no more editorial changes to be made. This may be done by some special code such as the word END, or may be effected as well by a control key in the field 430, this being an interchange available for any system function.

Thus, following the command input portion of Pass 1 edit mode operation, the edit tracks for the document, beginning with record No. 3 are as shown in Table IV below:

TABLE IV

Tape No. 1
Character Position No.:   1    5    10    15    20    25 (cont.)

Record No. 3 (edit track)   [41][0]D,P1,L1,R,P1,L3,M,P1,L3,(cont.)

30    35    40 h,T,P1,L3,T,P1,L1

11

Record No. 4 (edit track)   [32][0]brown*/(CR)jumped/(CR) (cont.)
leaped/(CR)h/(CR)(CR)/(CR)/(CR)

Before entering the edit commands into the edit track of the tape, the central processor 200 examines both the command and the text, if any, referred to for proper format and accuracy. To illustrate, for example, Table IIA depicts an erroneous form of the secnd replace command. Specifically, the word to be deleted "jumped" has been misspelled "jumpd", the format otherwise being proper for a replace command. The computer responds to the typed instruction by searching for the alphanumeric character set "jumpd" and does not find it in the referenced stored page 1, line 2 of the text. Accordingly, the computer prints out an appropriate diagnostic such as "ERROR" or "MATCH ERROR" and again asks for the second ("02:") correction.

To review then, following the editing command input phase of Pass 1, record No. 3 (edit track) stores the material shown therefor in Table IV, the record No. 3 data track contains the original text of Table I; and the record "3" address track repetitively contains the number "3". Similarly, the edit material for track 4 is shown in Table IV; the material in the text track is shown in Table I; and the number "4" recurs in the record track. Record No. 5 simply has the original text (Table I) in its data track, there simply being insufficient editing changes to require use of the edit track of this record. For completeness, it is observed as well that the first character in each edit track record follows a former identical to that for the data, document directory, and tape directory records, comprising an end pointer to signify the number of characters stored in that record.

After entry of all editorial input commands is completed, e.g., upon receipt of an END word, the composite editing system initiates a "mark" cycle to complete Pass 1 editing operation. More specifically, the purpose of the mark cycle is to enter into the data or text track of the data (text) records information sufficient to fully identify the changes to be made therein, e.g., where new text is to be inserted (or deleted, or moved, or the like), and the location where any new text is to be found. After such marking is completed, the actual process of effecting the changes is implemented during Pass 2 compilation more fully discussed below, with the revised text being stored on the alternate tape.

Returning to the mark-up procedure for Pass 1, a series of change commands may be defined as set forth in Table V:

TABLE V

| Operation | Command |
|---|---|
| Start deleting | : 10 [character no.] |
| End deleting | : 15 [character no.] |
| Block start | : 20 [character no.] |
| Block end | : 25 [character no.] |
| Insert text | : 30 [ch.no., rec.no.,ch.no.] |
| Move here | : 40 [ch.no.,rec.no.,ch.no.] |

Thus, for example, where a deletion is to be made, the command designation "10" is entered in an unused character location of a record data track, followed in the next character position with the character number of that record where the deletion is to begin. Further, the command 15 in the adjacent character position is in turn followed by the number of the character position where the deletion is to end. It is observed that the commands "10" and "15" are arbitrarily selected, and any alphanumeric entity may be employed.

The block start and block end commands 20 and 25 identify beginning and end points (character positions) of a block of text which is to be moved to some new location. The insert text command 30 is followed by a character number indicating where the insertion is to be made followed by a record number and character position number (edit track) where the beginning of the insertion will be found (the end of the material to be inserted is signalled by a stored slash and character return in the edit track see Table IV, record No. 4). Finally, the "move here" command 40 is followed by a character number where the insertion is to be made, also succeeded by a record number and character number (text track) from which the insertion is to be derived.

The net result of this second portion of Pass 1 operation is that the central processor 200 marks the text records in the data track with the proper editorial commands. The marked text for the assumed example, i.e., the storage state of text records 3 through 5 after Pass 1, is set forth in

TABLE VI

Tape No. 1  
Character  
Position No.:   1   35   10   13   15   20   (cont.)

Record No. 3 (data track)   [29][8]The*quick*brown*fox*(CR) (cont.)

25          30

(10) (13) (15) (18) (40) (22) (5) (3)

Record No. 4 (data track)   [16][0]the*green*fence(CR)

3   7   12   17   (cont.)

Record No. 5 (data track)   [28][12]has*jumped*over(CR) (10) (cont.)

20         24 25              30

(7) (15) (12) (30) (7) (4) (11) (20) (3) (25) (17)

To interpret record No. 3 (text track) from tape 1, the number "29" in the first character position is the end pointer signalling the presence of 29 usefully occupied character positions in the 128 character record, the "8" in the second character position signalling the presence of eight edit marking characters. Storage character positions 3–22 are the text material as originally typed (see Table I).

The "10" and "13" in character positions 23 and 24 indicate that a deletion (operation code 10) is to begin with character position 13 (the beginning b is "brown"), the deletion to end (operation code 15) at character storage location 18. The "40" in position 27 signals that text is to be moved into the line of text stored in the record after the record position 22, and that the material will be found beginning in text record No. 5 beginning with the material stored in the third character position. Record No. 4 (i.e., the second line of text) is unedited and thus is not changed. Finally, record No. 5 is marked as shown in Table VI. Some reflection in conjunction with the discussion above and the schedule of operation codes in Table V will confirm that the record markings identify a deletion of the work "jumped" (the edit marking characters in positions 19–22); insertion of the word "leaped" stored beginning with the character position 11 of record No. 4 (character positions 23–26); the block start and end signals (characters 27–30) which denote that the entire line corresponds to the block to be moved.

The material in the marked next track records (Table VI) at the end of the mark-up procedure of Pass 1 together with the literals stored in the edit track during the first phase of Pass 1, thus comprises all of the information necessary for editing and the regeneration of the document. This is done during Pass 2 operation by the central processor 200 which fetches the necessary line records from the tape, storing them in the RAM via a direct memory channel and in the central processor registers for processing. The material of the data and edit tracks of the tape thus comprise source material for the Pass 2 compiler which operates thereon. The result of this Pass 2 operation is revised text which is conceptually treated as a "new" and distinct document, stored as new records — e.g., in the next available record addresser on the alternate tape 2. The storage on tape 2 for the assumed example is set forth in Table VII.

TABLE VII

Tape No. 2  
Character Position No.:    1    5    10    15

| Record No. n (data track) | [14][0]The*quick*fox(CR) |
| Record No. n+1 (data track) | [16][0]has*leaped*over(CR) |
| Record No. n+2 (data track) | [16][0]the*green*fence(CR) |

The material stored in Table VII may be power typed in the manner above described, or may be further edited in a manner identical to that described above for the originally stored document. That is, the document stored on tape 2 is given a different document number and may be treated quite independent of the original draft which remains preserved on tape 1 in marked form.

Thus, the above described system has been shown by the above to store an original document typed at a keyboard 420 for storage in an assumed one of two magnetic tapes; and wherein an operator simply enters into the system, on a batched basis, an ensemble of editorial corrections to be made. The FIG. 1 system then operates on the original text and the editorial changes by marking the original text, and by operating on the marked text to form at the alternate tape a corrected document available for storage, further editing, and/or output power typing.

Figure 6:
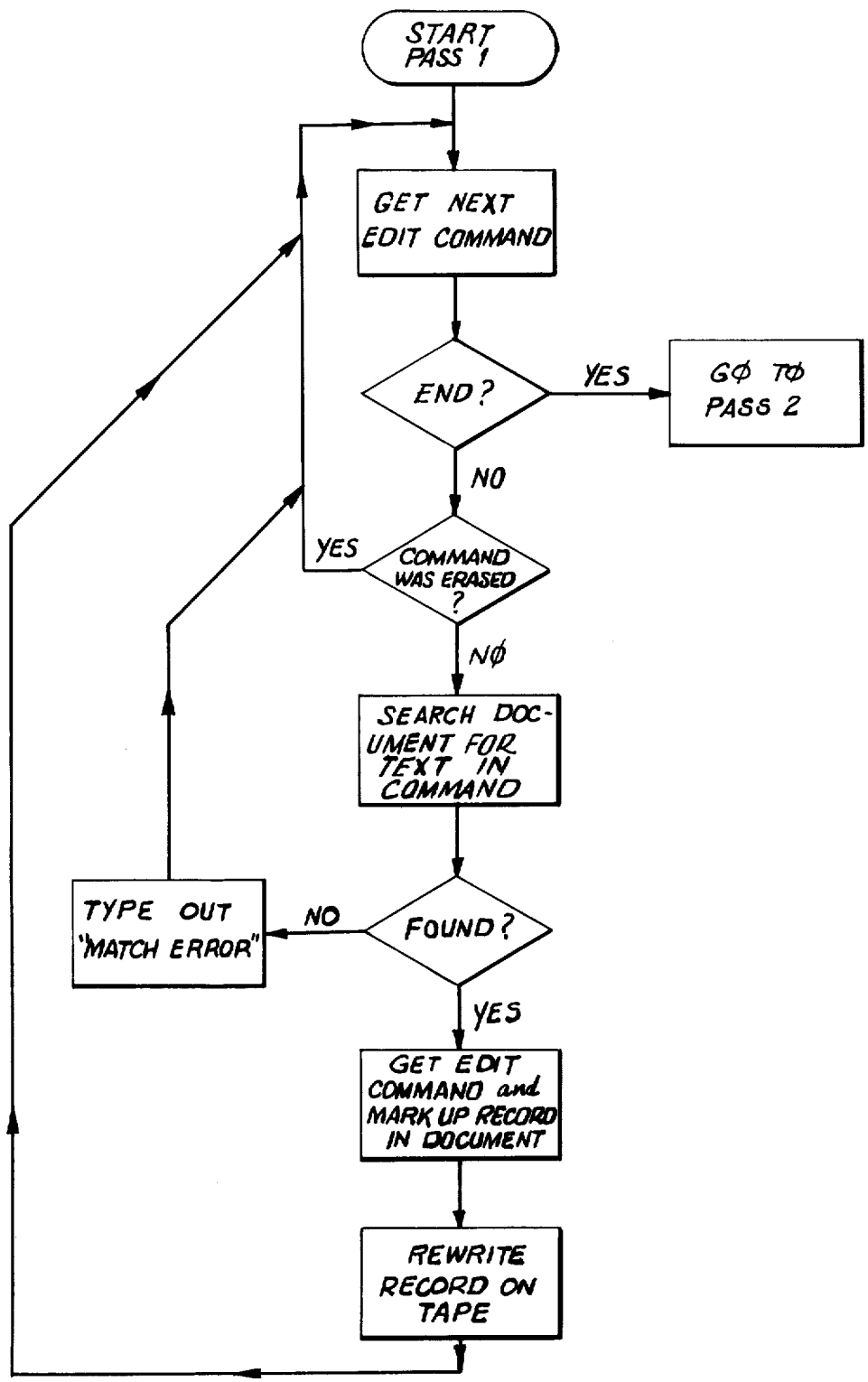
FIGS. 6 and 7 are flow charts characterizing Pass 1 and Pass 2 operations for the FIG. 1 system.
Figure 7:
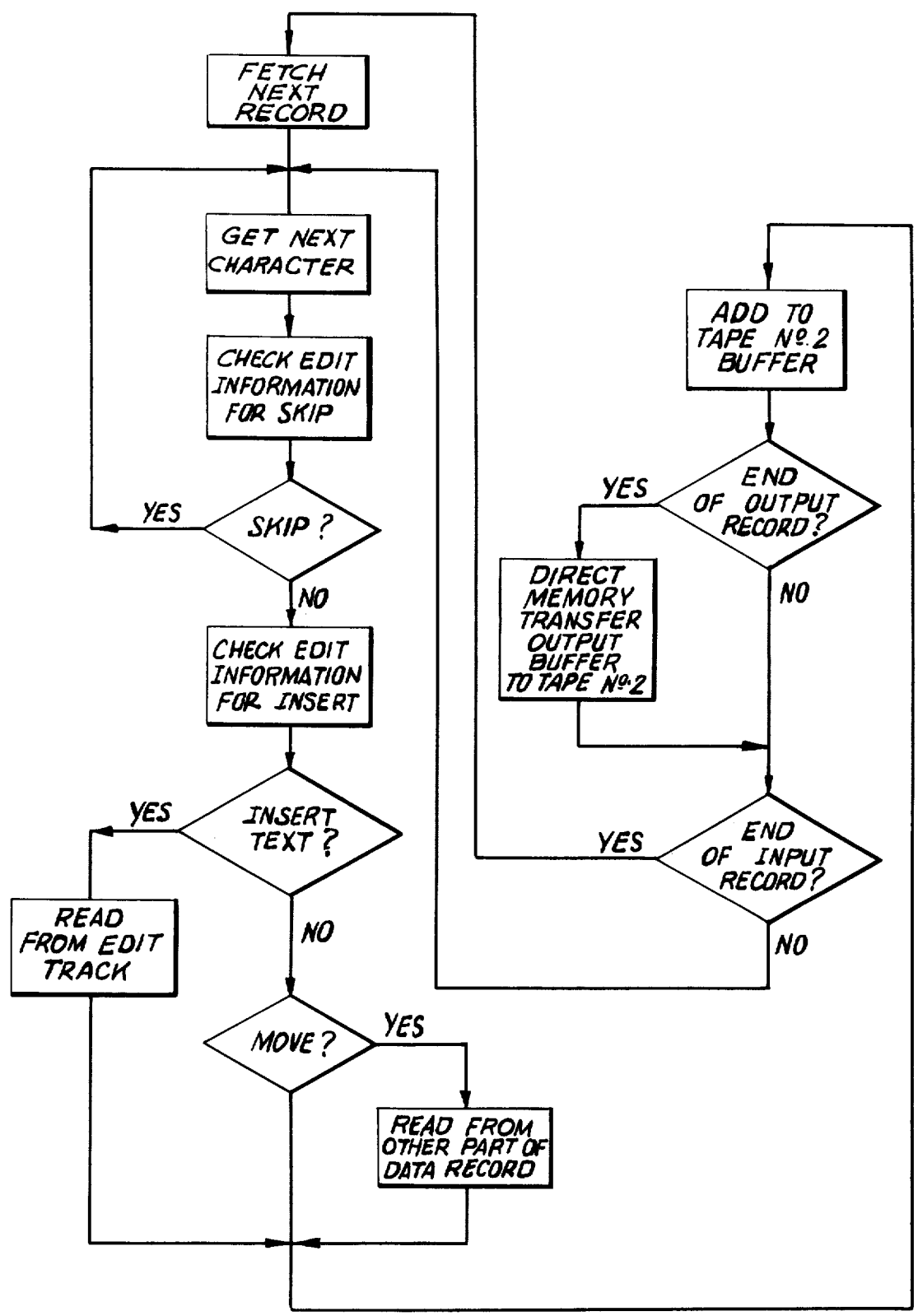

The particular coding for the Pass 1 and Pass 2 operations will be readily apparent to those skilled in the art from the above discussion, and will vary with the particular instruction set and processor being employed. Block diagrams for Pass 1 and Pass 2 operations are included in FIGS. 6 and 7.

The above described arrangement is merely illustrative of the principles of the present invention. Numerous modifications and adaptations thereof will be readily apparent to those skilled in the art without departing from the spirit and scope of the present invention. Thus, for example, only basic editing commands have been illustrated above. Additional such commands will be readily apparent to those skilled in the art. For example, an "indent" command may be assigned an operation code (Table V) and may be employed to in essence add space bar commands (analogous to "insert text") at the beginning of a line. Then also, the arrangement of FIG. 1 may justify text if desired by counting the characters which are assembled into each of the line records during Pass 2 operation, with a one word look ahead provision determining which word of a line of text exceeds the desired margin. This word is then printed out at the console 410 permitting the operator to signal by any format where the word is to be hyphenated. Other command functions, such as text block capitalization, underlining, or the like will be apparent as well to those skilled in the art.

Further, as an aid to forming edit commands, the system may include a paper holding mechanism with a transparent front sheet inscribed with line numbers. Hand corrected text may then simply be inserted in the holder, and an operator will have no difficulty in entering edit commands by visually scanning the text.

What is claimed is:

1. In combination in an automated editing system, text supplying means for serially supplying alpha-numeric characters and encoded control characters, first data storage means, a central processor for receiving and assembling said characters serially supplied by said text supplying means, storage means for storing said assembled characters in said first storage means, the improvement comprising means for supplying to said central processor in batched form editing commands for editing the text represented by the characters stored in said storage means, second storage means for storing signals representative of said editing commands, third storage means, and means connected to said storage means and said second and third storage means for operating upon said stored characters and said stored editing commands for generating a revised ensemble of alpha-numeric and control characters and for storing said revised character ensemble in said third storage means.

2. A combination as in claim 1, further comprising character outputting means, and means for exciting said character outputting means with said revised ensemble of characters produced by said ensemble generating means.

3. A combination as in claim 1, wherein said test supplying means comprises a keyboard including plural keys, and sensing and encoding means for generating plural parallel binary digits indicating which of said keys has been actuated.

4. A combination as in claim 1 wherein said first and second storage means comprise parallel tracks of a magnetic tape.

5. A combination as in claim 4 wherein said tape includes an additional track for storing a tape address.

6. A combination as in claim 5 wherein said third storage means comprises an additional magnetic tape.

7. In combination in an automated text recording and editing system, keyboard means for generating serial encoded characters, text storing means, stored program controlled central processor means for assembling said serial characters into plural character records, means for storing said assembled records in said text storing means, memory means coupled to said processor means, said memory means including a first program storing portion and a second variable storing portion, said second memory portion being of read-write construction, edit command storing means, means for storing batched edit commands serially entered at said keyboard means in said edit storing means, first compiler means for marking said character records in said text storing means in accordance with the contents of said edit command storing means, and second compiler means for producing plural revised character records in accordance with and responsive to the stored contents of said marked character records in said text storing means and the stored contents of said edit command storing means.

8. A combination as in claim 7, further comprising additional storage means for storing the revised character records generated by said second compiler means.

9. A combination as in claim 7, further comprising charactr printing means, and means for enabling said printing means responsive to the revised character records produced by said second compiler means.

10. A combination as in claim 7, wherein said text storing means comprise parallel tracks of a ferromagnetic tape.

11. A combination as in claim 10, wherein said ferromagnetic tape comprises an additional track bearing successive tape record storing addresses.

12. A combination as in claim 8, wherein additional storage means comprises an additional ferromagnetic tape.

13. In combination in an automated text recording and editing system, plural common system buses including an input bus, and output bus, a command bus and a selector bus, a stored program controlled central processor connected to said system buses, input-output means connected to said system buses, at least one tape controller connected to said system buses, information storage tape means controlled by said tape controller, a memory including a first program storing portion and a second operand storing portion, said second memory portion comprising read and write memory means, means connecting said central processor with said memory for reading commands from said memory first portion to said processor and for coupling data between said processor and said memory, said processor including means for issuing a coded identification signal pattern on said selector bus for enabling a selected one of said input-output means or said tape controller, means included in said central processor for issuing a mode command on said command bus, means included in said central processor for supplying output information on said output bus and for receiving information on said input bus, said input-output means including means for supplying serial text information and control characters to said central processor, said central processor including means for assembling said characters into records and means operative in conjunction with said second portion of said memory for storing said characters on a selected tape, means for entering editing commands generated at said input-output means on a selected tape via said processor, revision means for operating upon said entered editing commands and said stored character records for generating revised character records marked with editing commands, and means connected and responsive to said revision means for storing said marked character records.

14. A combination as in claim 13, further comprising second revision means for operating upon said stored marked records and said stored editing commands for producing further revised character records.

15. A combination as in claim 14, wherein said editing system includes a second tape controller and additional tape means controlled thereby, said further revised character records being stored on said additional tape means via said second tape controller.

16. A combination as in claim 14, wherein said first memory portion comprises a read only memory.

17. A combination as in claim 14, further comprising a system controlling switch field connected to said system buses.

18. A combination as in claim 14, further comprising high speed direct memory channel communication means for connecting said second portion of said memory with each of said tape controllers.

19. A combination as in claim 13, wherein said stored program controlled central processor includes a micro processor, plural processor output registers for receiving output signals from said micro processor, signal propagation means for coupling the signals stored in one of said registers to said memory operand storing second portion, a device selection register loaded by one of said processor output registers, and means responsive to the stored contents of said device selection register for energizing said selector bus.

20. A combination as in claim 19, further comprising multiplex means for selectively supplying input information to said micro processor from said memory and from said input data bus.

21. A combination as in claim 19, further comprising plural direct memory channel means, and multiplex means for accessing said memory from a selected one of said direct memory channel means or a processor register.

22. A combination as in claim 21, further comprising logic means responsive to the state of said tape controller for selectively signalling said multiplexer.

23. A combination as in claim 13, wherein said input-output equipment comprises an electronic typewriter including a keyboard and a printer, a command decoder enabled by said selector bus for responding to signals supplied thereto via said command bus, key encoding means connected to the keyboard of said electrical typewriter, and gate means selectively enabled by said command decoder for energizing said input bus with the output of said key encoding means.

24. A combination as in claim 23, wherein said input-output equipment further comprises additional decoder means selectively energized by said command decoder for responding to signals present on said output bus by causing printing at said electrical typewriter.

25. A combination as in claim 24, further comprising logic means responsive to the output of said decoder for selectively inhibiting typing at said electrical typewriter keyboard.

26. A combination as in claim 25, further comprising disjunctive logic means for providing a status signal to said processor responsive to depression of a key at said typewriter keyboard.

27. A combination as in claim 13, wherein said input-output equipment further comprises a plurality of function key switches, register means for recording an actuation of a key switch, a command decoder, and gating means selectively actuated by the output of said decoder for impressing key actuation signals on said input bus.

28. A combination as in claim 27, further comprising plural status indicating light means, additional register means for selectively energizing said light means, and gating means responsive to said command decoder for selectively loading said register means with the contents of said output bus.

29. A combination as in claim 13, wherein said tape controller comprises a shift register, read head means for serially reading characters from said tape means into said shift register, means for counting the characters read from said tape means, and gate means enabled by said character counting means for providing parallel data output signals.

30. A combination as in claim 13, wherein said tape controller comprises a down counter loaded via said output bus, an envelope detector responsive to the output of said tape means for selectively providing toggle pulses to said down counter, and state decoder means connected to said down counter for selectively signalling when a block of information has been read from said tape means.

31. A combination as in claim 29, wherein said tape controller further comprises a down counter loaded via said output bus, an envelope detector responsive to the output of said tape means for selectively providing toggle pulses to said down counter, and state decoder means connected to said down counter for selectively signalling when a block of information has been read from said tape means.

32. A combination as in claim 31, wherein said tape controller further comprises motor controller means for driving said tape means, and command decoder and sequential network means responsive to the signals on said command bus and selectively enabled by said selector bus for controlling said tape driving means and said down counter.

33. A combination as in claim 32, further comprising status buffer gate means connected to said motor controller means and said command decoder and sequential network means for selectively supplying tape controller status information to said input bus.

34. A combination as in claim 29, further comprising additional gate means for loading said shift register from said memory operand storage portion in a parallel manner, means for serially shifting the information out of said shift register, and write head means responsive to the output of said shift register for storing said information on said tape means.

* * * * *